(12) United States Patent
Maknojia et al.

(10) Patent No.: US 10,666,517 B2
(45) Date of Patent: May 26, 2020

(54) END-TO-END AUTOMATED SERVICING MODEL FOR CLOUD COMPUTING PLATFORMS

(71) Applicant: Microsoft Technology Licensing, LLC, Redmond, WA (US)

(72) Inventors: Rahim Maknojia, Redmond, WA (US); Cheng Wei, Redmond, WA (US); Shawn Lucas, Redmond, WA (US); Robert S. T. Gibson, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 133 days.

(21) Appl. No.: 15/148,032

(22) Filed: May 6, 2016

(65) Prior Publication Data

US 2017/0171029 A1 Jun. 15, 2017

Related U.S. Application Data

(60) Provisional application No. 62/267,591, filed on Dec. 15, 2015.

(51) Int. Cl.
*G06F 8/658* (2018.01)
*G06F 8/65* (2018.01)
(Continued)

(52) U.S. Cl.
CPC ............... *H04L 41/12* (2013.01); *G06F 8/65* (2013.01); *G06F 8/658* (2018.02); *H04L 67/10* (2013.01)

(58) Field of Classification Search
None
See application file for complete search history.

(56) References Cited

U.S. PATENT DOCUMENTS 6,480,508 B1 11/2002 Mwikalo et al.
6,587,455 B1 7/2003 Ray et al.
(Continued)

FOREIGN PATENT DOCUMENTS

| CN | 103257878 A | 8/2013 |
| WO | 2012065641 A1 | 5/2012 |
| WO | 2014153311 A1 | 9/2014 |

OTHER PUBLICATIONS

International Patent Application No. PCT/US2016/065038; Written Opinion; dated Nov. 6, 2017; 7 pages.
(Continued)

*Primary Examiner* — Sargon N Nano
*Assistant Examiner* — Christopher B Robinson
(74) *Attorney, Agent, or Firm* — Alleman Hall Creasman & Tuttle LLP

(57) ABSTRACT

The application is directed to a cloud computing platform. The cloud computing platform includes a memory having instructions stored thereon for managing updates the cloud computing platform. The cloud computing platform also includes a controller, operably coupled to the memory. The controller is configured to execute an instruction of identifying an update for an existing cloud computing service operating on the cloud computing platform. The controller is also configured to download the update for the existing service. The controller is also configured to merge the differences between the downloaded update and the existing service to create a new image. The controller is also configured to test the new image offline. Further, the controller is configured to validate the new image online.

20 Claims, 7 Drawing Sheets

(51) Int. Cl.
*H04L 12/24* (2006.01)
*H04L 29/08* (2006.01)

(56) References Cited

U.S. PATENT DOCUMENTS

| | | | |
|---|---|---|---|
| 7,853,714 B1 | 12/2010 | Moberg et al. | |
| 7,873,960 B2 | 1/2011 | Templin et al. | |
| 7,970,765 B1 | 6/2011 | Olsen et al. | |
| 8,261,295 B1 | 9/2012 | Risbood et al. | |
| 8,495,611 B2 | 7/2013 | McCarthy et al. | |
| 8,707,429 B2 | 4/2014 | Wilbourn et al. | |
| 8,762,574 B2 | 6/2014 | Barber | |
| 8,819,701 B2 | 8/2014 | Wheeler et al. | |
| 8,825,839 B2 | 9/2014 | Brandt et al. | |
| 8,874,790 B2 | 10/2014 | McPherson | |
| 8,909,767 B2 | 12/2014 | Sunkara et al. | |
| 8,935,427 B2 | 1/2015 | Outhred et al. | |
| 9,015,694 B2 | 4/2015 | Gray et al. | |
| 9,047,133 B2 | 6/2015 | Winterfeldt et al. | |
| 9,141,364 B2 | 9/2015 | Brant et al. | |
| 2002/0034105 A1* | 3/2002 | Kulkarni | G11C 16/102 365/200 |
| 2002/0112076 A1 | 8/2002 | Rueda et al. | |
| 2003/0196083 A1* | 10/2003 | Grawrock | G06F 21/57 713/156 |
| 2005/0132179 A1* | 6/2005 | Glaum | G06F 11/1433 713/1 |
| 2005/0132348 A1 | 6/2005 | Meulemans et al. | |
| 2006/0013209 A1 | 1/2006 | Somasundaram | |
| 2007/0233851 A1 | 10/2007 | Ma | |
| 2008/0189415 A1 | 8/2008 | Vaswani et al. | |
| 2009/0043900 A1 | 2/2009 | Barber | |
| 2010/0061250 A1 | 3/2010 | Nugent | |
| 2010/0131948 A1 | 5/2010 | Ferris | |
| 2010/0287363 A1* | 11/2010 | Thorsen | G06F 21/575 713/2 |
| 2010/0306765 A1 | 12/2010 | DeHaan | |
| 2011/0010691 A1 | 1/2011 | Lu et al. | |
| 2011/0016473 A1 | 1/2011 | Srinivasan | |
| 2011/0029673 A1 | 2/2011 | Jaisinghani | |
| 2011/0055712 A1 | 3/2011 | Tung et al. | |
| 2011/0126197 A1* | 5/2011 | Larsen | H04L 9/3213 718/1 |
| 2011/0138050 A1 | 6/2011 | Dawson et al. | |
| 2012/0240135 A1 | 9/2012 | Risbood et al. | |
| 2012/0291021 A1* | 11/2012 | Banerjee | G06F 8/654 717/173 |
| 2012/0324069 A1 | 12/2012 | Nori et al. | |
| 2012/0324281 A1* | 12/2012 | Goroff | G06F 11/2215 714/15 |
| 2013/0024503 A1 | 1/2013 | Neerdaels | |
| 2013/0104126 A1 | 4/2013 | Padrnanabhuni et al. | |
| 2013/0232498 A1 | 9/2013 | Mangtani et al. | |
| 2013/0291052 A1 | 10/2013 | Hadar et al. | |
| 2014/0033188 A1 | 1/2014 | Beavers et al. | |
| 2014/0075426 A1 | 3/2014 | West et al. | |
| 2014/0089523 A1 | 3/2014 | Roy et al. | |
| 2014/0095676 A1 | 4/2014 | Beno et al. | |
| 2014/0172783 A1 | 6/2014 | Suzuki et al. | |
| 2014/0173683 A1 | 6/2014 | Zhang et al. | |
| 2014/0181306 A1 | 6/2014 | Kothamasu et al. | |
| 2014/0185627 A1* | 7/2014 | Ditya | H04L 45/44 370/409 |
| 2014/0189677 A1 | 7/2014 | Curzi et al. | |
| 2014/0196022 A1 | 7/2014 | Skutin et al. | |
| 2014/0229939 A1* | 8/2014 | Dias de Assuncao | G06F 8/63 718/1 |
| 2014/0237464 A1* | 8/2014 | Waterman | G06F 8/65 717/172 |
| 2014/0269712 A1 | 9/2014 | Kidambi | |
| 2014/0282469 A1 | 9/2014 | Johnson et al. | |
| 2014/0298333 A1 | 10/2014 | Yoshida et al. | |
| 2014/0359552 A1 | 12/2014 | Misra et al. | |
| 2015/0058444 A1 | 2/2015 | Willmann | |
| 2015/0063351 A1 | 3/2015 | Moreno et al. | |
| 2015/0074221 A1 | 3/2015 | Kuparinen et al. | |
| 2015/0131674 A1 | 5/2015 | Kao et al. | |
| 2015/0172204 A1 | 6/2015 | Anderson et al. | |
| 2015/0244643 A1 | 8/2015 | Kinoshita et al. | |
| 2015/0256508 A1 | 9/2015 | Townsend et al. | |
| 2015/0264121 A1 | 9/2015 | Van Biljon et al. | |
| 2015/0281111 A1 | 10/2015 | Carl | |
| 2015/0295781 A1 | 10/2015 | Maes | |
| 2015/0378703 A1 | 12/2015 | Govindaraju et al. | |
| 2016/0019053 A1* | 1/2016 | Gambardella | H04L 65/80 717/172 |
| 2017/0139695 A1 | 5/2017 | Govindaraju et al. | |
| 2017/0171029 A1 | 6/2017 | Maknojia et al. | |
| 2017/0171033 A1 | 6/2017 | Lucas et al. | |
| 2017/0171034 A1 | 6/2017 | Lucas et al. | |
| 2017/0171146 A1 | 6/2017 | Sharma et al. | |

OTHER PUBLICATIONS

Peter Pawlak; "Software Update Service to Ease Patch Distribution"; Microsoft; Apr. 2002; 6 pages.

International Patent Application No. PCT/US2016/065469; Int'l Search Report and the Written Opinion; dated Mar. 22, 2017; 17 pages.

Hirofuchi, et al., "A Live Storage Migration Mechanism over WAN for Relocatable Virtual Machine Services on Clouds", In Proceedings of the 9th IEEE/ACM International Symposium on Cluster Computing and the Grid, May 18, 2009, pp. 460-465.

Voorsluys, et al., "Cost of Virtual Machine Live Migration in Clouds: A Performance Evaluation", In Proceedings of the 1st International Conference on Cloud Computing, Nov. 22, 2009, pp. 1-12.

Wettinger, et al., "DynTail—Dynamically Tailored Deployment Engines for Cloud Applications"; Institute of Architecture of Application Systems, University of Stuttgart, Germany; 2015; 9 pages.

Vixie: "Extension Mechanisms for DNS (EDNS0)"; Network Working Group; The Internet Society; Aug. 1999; 8 pages.

Tejada, et al,, "Exam Ref 70-532 Developing Microsoft Azure Solutions", In Publication of Microsoft Press, Mar. 16, 2015, 432 pages.

International Patent Application No. PCT/US2016/065468; Int'l Search Report and the Written Opinion; dated Mar. 17, 2017; 16 pages.

International Patent Application No. PCT/US2016/065040; Int'l Search Report and the Written Opinion; dated Mar. 3, 2017; 12 pages.

Caballer, et al., "A Platform to Deploy Customized Scientific Virtual Infrastructures on the Cloud", In Proceedings of 6th International Workshop on Science Gateways, Jun. 3, 2014, 6 pages.

"Second Written Opinion Issued in PCT Application No. PCT/US2016/065468", dated Nov. 17, 2017, 9 Pages.

"Second Written Opinion Issued in PCT Application No. PCT/US2016/065040", dated Oct. 19, 2017, 6 Pages.

"Second Written Opinion Issued in PCT Application No. PCT/US2016/065038", dated Nov. 6, 2017, 7 Pages.

"Liferay 6.1.1 (Blueprint) by BitNami", Published on: Oct. 30, 2014 Available at: https://solutionexchange.vmware.com/store/products/liferay-6-1-1-blueprint-by-bitnami.

"International Preliminary Report on Patentability Issued in PCT Application No. PCT/US2016/065469", dated Mar. 5, 2018, 9 Pages.

"International Preliminary Report on Patentability Issued in PCT Application No. PCT/US2016/065040". dated Jan. 26, 2018, 7 Pages.

"International Preliminary Report on Patentability Issued in PCT Application No. PCT/US2016/065038", dated Mar. 14, 2018, 8 Pages.

"InstallAnywhere—Create Multiplatform Installations from a Single Project File—Physical, Cloud, and Virtual Environments", Published on: Sep. 22, 2015 Available at: http://www.flexerasoftware.com/producer/products/software-installation/installanywhere/.

(56) References Cited

OTHER PUBLICATIONS

"Google Cloud Platform", Published on: Sep. 11, 2015 Available at: https://cloud.google.com/deployment-manager/step-by-step-guide/setting-metadata-and-startup-scripts.
"FAQ on Cloud Application Development—Keyedin Solutions, Inc", Published on: Apr. 11, 2014 Available at: http://www.keyedin.com/saas-solutions/konfigure/faq-on-cloud-application-development/.
"Empowering Enterprise Cloud Development", Published on: Feb. 6, 2015 Available at: http://www.collab.net/services/consulting.
U.S. Appl. No. 15/148,831, filed May 6, 2016, Shawn M. Lucas.
U.S. Appl. No. 15/148,919, filed May 6, 2016, Shawn Lucas.
"Second Written Opinion Issued in PCT Application No. PCT/US2016/065469", dated Oct. 24, 2017, 8 Pages.
"International Preliminary Report on Patentability Issued in PCT Application No. PCT/US2016/065468", dated Mar. 27, 2018, 10 Pages.
"International Search Report and Written Opinion Issued in PCT Application No. PCT/US2016/065038" dated Mar. 17, 2017, 10 Pages.
"Non Final Office Action Issued in U.S Appl. No. 16/148,919", dated Feb. 5, 2018, 17 Pages.
"Non Final Office Action Issued in U.S. Appl. No. 15/148,831", dated Mar. 5, 2018, 12 Pages.

* cited by examiner

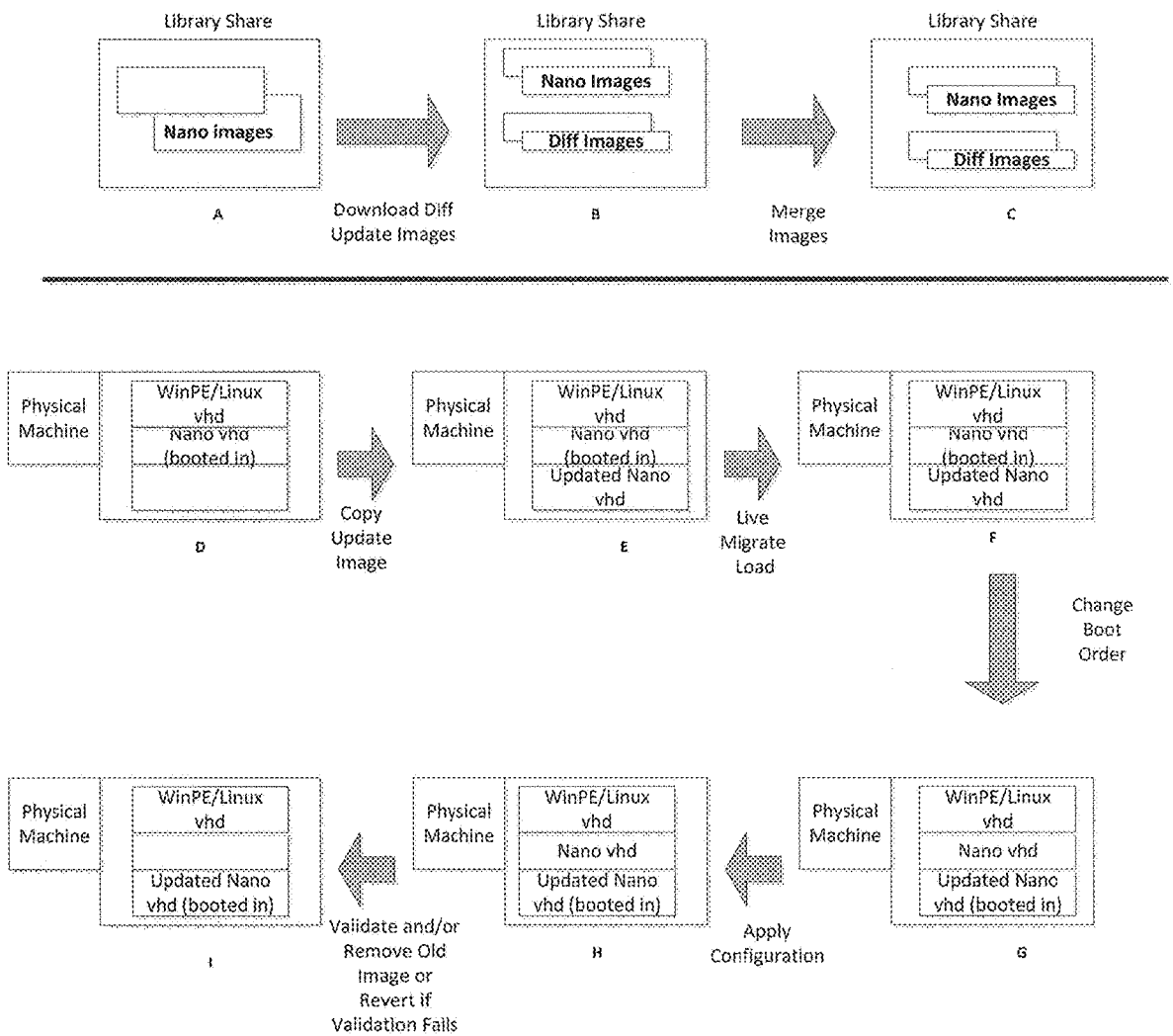
FIGs. 5A-I

1. Identifying an Update for an Existing Cloud Computing Service Operating on a Cloud Computing Platform 2. Downloading the Update for the Existing Service 3. Merging Differences between the Downloaded Update and the Existing Service to Create a New Image 4. Testing the New Image Offline 5. Copying the New Image to an Online Node in a Data Center 6. Validating the New Image Online

FIG. 5J

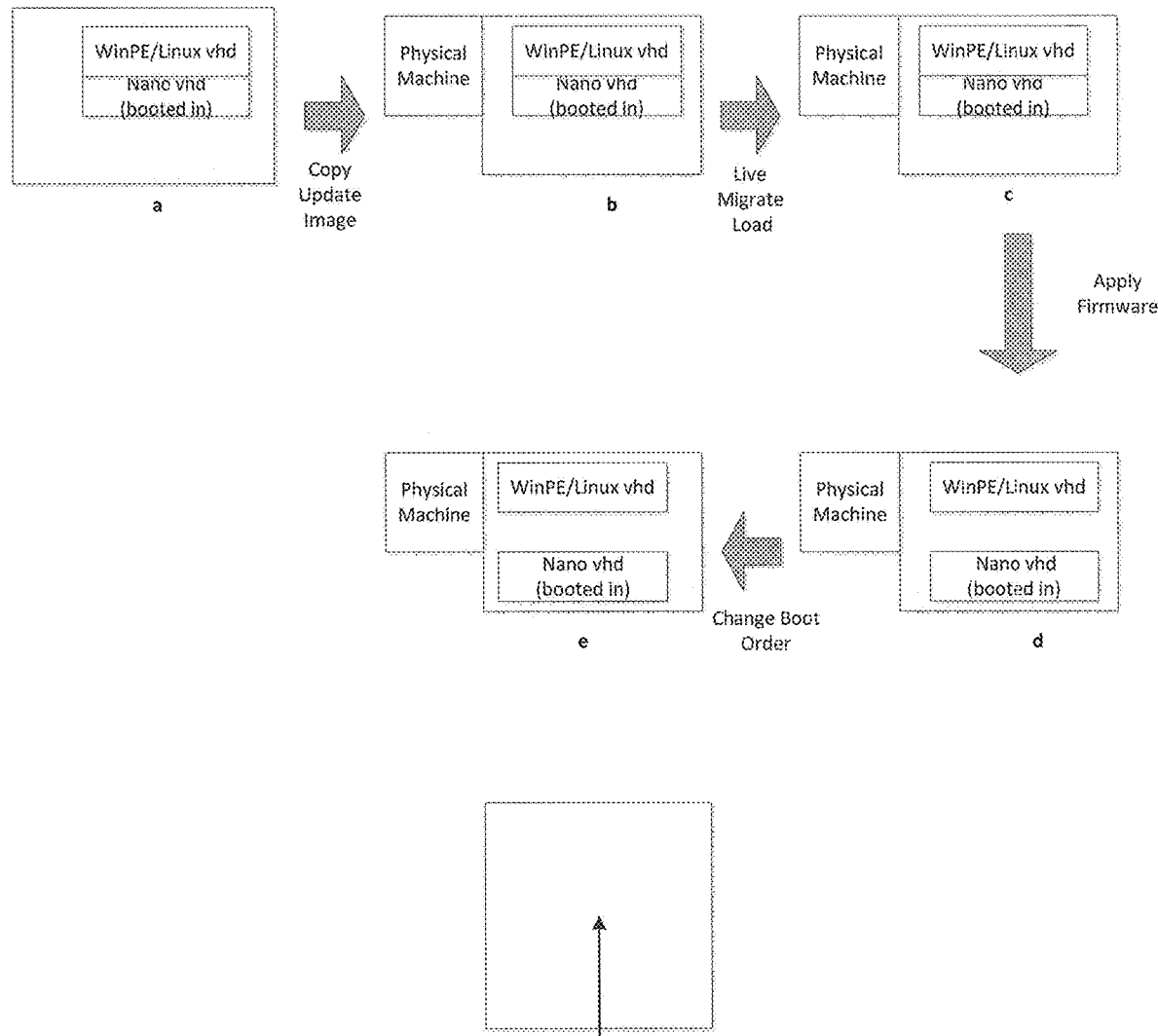
FIGs. 6A-E

END-TO-END AUTOMATED SERVICING MODEL FOR CLOUD COMPUTING PLATFORMS

RELATED APPLICATIONS

The instant application claims the benefit of priority of U.S. Provisional Application No. 62/267,591 filed on Dec. 15, 2015, titled, "End-to-End Automated Servicing Model for Cloud Computing Platforms" which is incorporated by reference in its entirety.

TECHNICAL FIELD

This disclosure generally relates to automating the patching process in a cloud computing platform.

BACKGROUND

Generally, cloud computing may be used to leverage the virtualization of computing infrastructures such as computer networks, servers, software applications and service. Cloud computing service providers offer their computing infrastructures as a fully outsourced service to their customers. By so doing, these companies can dramatically reduce costs associated with hardware, software and support by paying cloud computing service providers under a "pay-as-you-go" model.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. Alternatively, a private cloud environment is generally intended for use by, or within, a single organization. Further, a community cloud is intended to be shared by several organizations within a community. Lastly, a hybrid cloud includes two or more types of clouds, e.g., private, community, or public, which are bound together by data and application portability.

Cloud computing services may be offered at various layers of the software stack. At a lower layer, Infrastructure as a Service (IaaS) systems allow users, such as for example system administrators, to have access to nodes hosted by the cloud computing provider across one or more data centers. These nodes may include physical machines, virtual machines (VMs) and containers.

Over time, updates on one or more deployed services may be required. This is commonly referred to as patching. During patching, the entire file for a particular service may be updated. However, currently available patching techniques can cause interruptions in services, especially in systems running a stack, e.g., Microsoft Azure Stack (MAS), which may host tens of hundreds of interwoven nodes. Such interruptions can negatively impact the user experience.

What is desired is a system and technique for eliminating or reducing the detrimental impacts to interwoven nodes running in a stack via patching processes.

What is also desired is a system and technique for improving recovery of past updates if the patch cannot be validated.

SUMMARY

This summary is provided to introduce a selection of concepts in a simplified form that is further described below in the Detailed Description. This summary is not intended to limit the scope of the claimed subject matter. The foregoing needs are met, to a great extent, by the present application directed to a process and apparatus for automating a patching process in a cloud computing platform.

One aspect of the application is directed to a cloud computing platform. The cloud computing platform includes a memory having instructions stored thereon for managing the cloud computing platform. The cloud computing platform also includes a controller, operably coupled to the memory. The controller is configured to execute an instruction of identifying an update for an existing cloud computing service operating on the cloud computing platform. The controller is also configured to execute an instruction of downloading the update for the existing service. The controller is also configured to execute an instruction of merging the differences between the downloaded update and the existing service to create a new image. The controller is configured to execute an instruction of testing the new image offline. Further, the controller is configured to execute an instruction of validating the new image online.

Another aspect of the application is directed to a computer-implemented process operating on a cloud computing platform. The process includes a step of comprising the step of identifying, via a controller, an update for an existing cloud computing service operating on the cloud computing platform. The process also includes the step of downloading, via the controller, the update for the existing service. The process also includes the step of merging, via the controller, the differences between the downloaded update and the existing service to create a new image. The process also includes the step of testing, via the controller, the new image offline. The process also includes the step of copying, via the controller, the new image to an online node in a data center. Further, the process includes the step of validating, via the controller, the new image online.

Yet another aspect of the application is directed to a networked system. The system includes a node located in a remote data center. The system also includes a cloud computing platform operably coupled to the node. The cloud computing platform includes a memory having instructions stored thereon for managing updates on the cloud computing platform. The platform also includes a controller, operably coupled to the memory, and configured to execute the instruction of downloading an update for an existing cloud computing service operating on the cloud computing platform. The platform also is configured to execute the instruction of merging differences between the downloaded update and the existing service to create a new image. The platform also in configured to test the new image offline. Further, the platform is configured to validate the new image online.

There has thus been outlined, rather broadly, certain aspects in order that the detailed description thereof may be better understood, and in order that the present contribution to the art may be better appreciated. There are, of course, additional aspects that will be described below and which will form the subject matter of the claims appended hereto.

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended only to be illustrative.

FIGS. 5A-I illustrate an exemplary flow diagram for updating a service on a cloud computing platform according to an aspect.

FIG. 5J illustrates an exemplary flow diagram in accordance with FIGS. 5A-I according to an aspect.

FIGS. 6A-E illustrate another exemplary flow diagram for updating a service on a cloud computing platform using firmware according to an aspect.

DETAILED DESCRIPTION

A detailed description will be discussed in reference to various figures, and aspects herein. Although this description provides detailed examples of possible implementations, it should be noted that the details are intended to be examples and thus do not limit the scope of the technology described in this application.

Reference in this specification to "one aspect," "an aspect," "one or more aspects," or the like means that a particular feature, structure, or characteristic described in connection with the aspect is included in at least one aspect of the application. Moreover, the term "aspect" in various places in the specification is not necessarily referring to the same aspect. That is, various features are described which may be exhibited by some aspects and not by others.

According to one aspect, a cloud computing platform is described. The platform may be less prone to errors and thus more reliable. This is at least associated to one or more services installed offline, and then configured online. The platform may also provide greater recoverability in the event that the updates cannot successfully be validated. The cloud computing platform may automatically update, i.e., patch, services in a stack.

The platform may include one or more nodes on which the services are deployed. The nodes may include physical machines, virtual machines (VMs) and stacks. Apart from physical machines, VMs operate based upon the computer architecture and functions of a real or hypothetical computer. VMs typically run a full copy of an operating system in addition to all of the hardware that the operating system needs to run. Containers, on the other hand, may take up less system resources than VMs. Specifically, containers include enough of an operating system to support programs and libraries, and system resources to run a specific program. Containers therefore can pack more applications into a single physical server than VMs.

Application Stack

Figure 1:
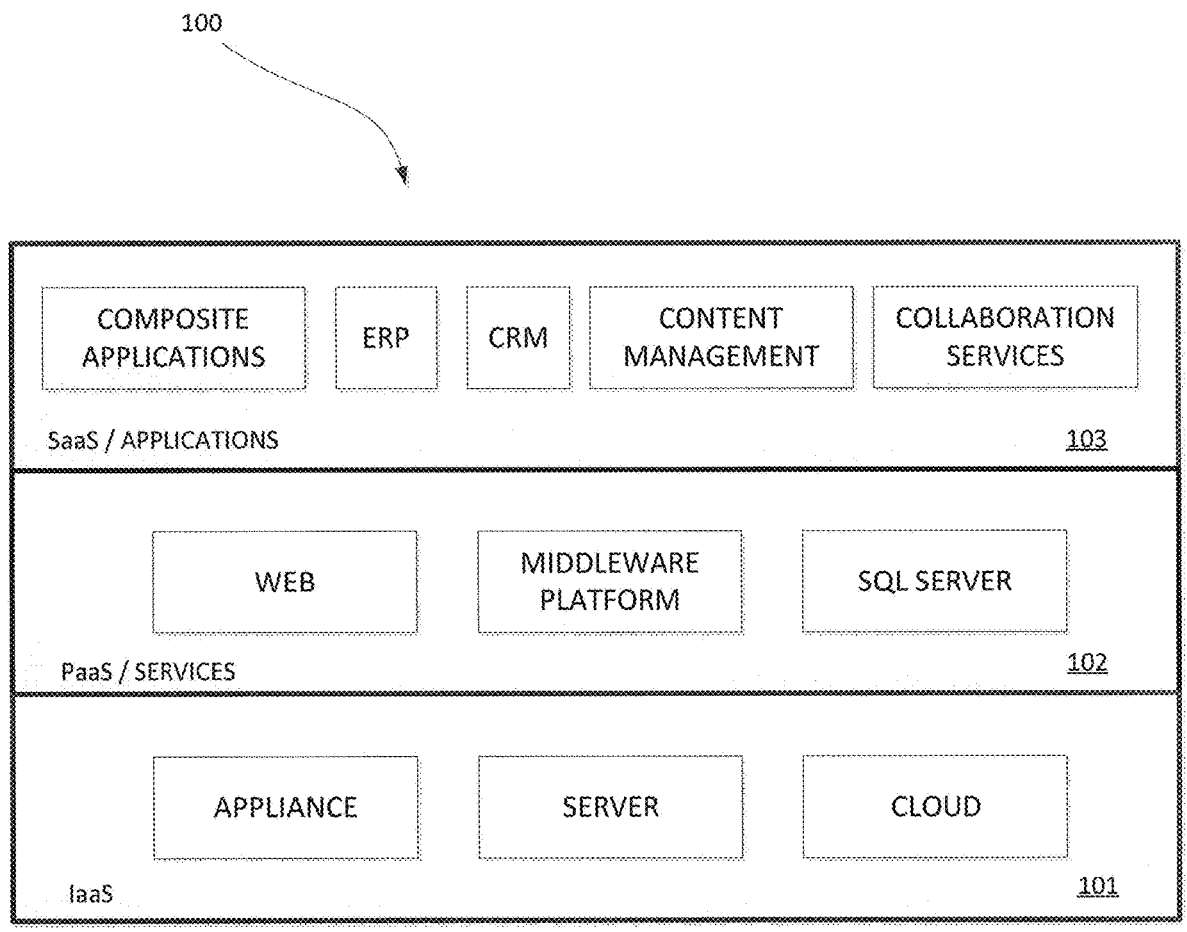
FIG. 1 illustrates the layering of services in an application stack according to an aspect of the application.

FIG. 1 illustrates layering of services in an application stack 100. Infrastructure as a Service (IaaS) layer 101 virtualizes hardware and OS using, for example, appliance, server, and cloud platforms. In one embodiment, IaaS layer 101 provides an elastic compute fabric on Azure Fabric, Windows server farms, the WINDOWS AZURE public cloud and the Microsoft Azure Stack (MAS) private cloud.

The Platform as a Service (PaaS) layer 102 virtualizes data and middleware components. PaaS layer 102 may comprise a service for web components, a middleware service as described herein, and a SQL server for data services. In one embodiment, PaaS layer 102 includes a WINDOWS AZURE or stack platform with Azure services and its service model. Additionally, a stateful fabric may provide platform scalability and availability for state management, and SQL AZURE™ may provide database as a service in PaaS layer 102 in other embodiments.

The Software as a Service (SaaS) layer 103 virtualizes application components for end users. Composite applications, such as Enterprise Resource Planning (ERP), Customer Relationship Management (CRM), content management, and collaboration services, are deployed in SaaS layer 103 as application services. For example, in one embodiment, SHAREPOINT® and MICROSOFT DYNAMICS® may be deployed in the SaaS layer 103.

A middleware platform in the PaaS layer may provide a framework and middleware services for developing, deploying and managing composite applications. The middleware platform may be developed and deployed on-premises, on the cloud, or in a hybrid environment. For example, the middleware platform may be deployed in some embodiments on WINDOWS SERVER and/or WINDOWS AZURE and/or Microsoft MAS. The middleware platform may include a collection of middleware services, an application model for composing the services into a composite application, a container to host the composition logic, and unified lifecycle management of the composite application and its constituent services.

Cloud Computing Platforms

Advances in commodity hardware, virtualization, and virtual server farms have paved the way for "cloud" computing platforms. Resource virtualization in cloud platforms provides higher infrastructure efficiencies. Cloud computing platforms allow elastic resource utilization and avoid overcapacity by providing on-demand provisioning of resources. Cloud computing platforms provide on-demand access to near unlimited compute and storage capacity. For example, an application may request initial compute, storage, and network capacity and then can elastically scale up or down as needed. WINDOWS AZURE or AZURE STACK is an example of a cloud platform providing an elastic computing environment, storage services, and application hosting capabilities. Cloud computing platforms may allow applications to start new VMs or to shut down running VMs on-demand to meet current end-user needs.

The cloud computing platform has caused a shift from applications as packaged software to applications or application components as services. The cloud platform technology enables: Service Oriented Architecture (SOA)-based application architecture with scale and availability; access to multiple data and application sources; deployment flexibility; and on-premises and cloud symmetry. The shift to applications and application components as services also promotes a Service Level Agreement (SLA) based application behavior in which applications specify their performance, scalability, and availability requirements using SLAs rather than in terms of physical resources. These benefits are expected to compel many applications to shift to cloud technologies so that more applications will be delivered as services. Application and middleware services may be offered as autonomous services, and composite applications may be offered as a loose federation of these application and middleware services. The application components may be mapped to provisioned services. In addition to pre-defined middleware services, such as caching and messaging, user-developed applications may also be provisioned as services. Components are exposed as services, and composite applications become a composition of these services.

Virtualization technology provides a multi-tenant operating system environment by virtualizing hardware. Multiple applications may be run independently on a single core by running multiple VMs on a processor core. When applications use higher density multi-tenancy, deployment costs can be minimized. Application platforms provide another level of multi-tenancy by allowing multiple applications to concurrently run on a single VM. Even higher levels of multi-tenancy are possible if applications are architected to support multiple customers sharing the application execution environment concurrently. Such high density multi-tenancy may require the underlying storage systems, such as a Database Management System (DBMS), to be multi-tenant. Accordingly, a customer may gain significant cost savings when multi-tenancy is supported across the whole application stack, including the OS, DBMS, and application platform.

The cloud is ubiquitous and cloud (web) APIs make it accessible from anywhere. This positions the cloud as a hub or broker for a variety of clients—devices, users, businesses, applications, etc. Devices can connect to the cloud to access data; users to communicate; businesses, e.g., buyers and sellers, to negotiate; or applications to integrate. Such ubiquitous connectivity enables applications to be connected applications. A cloud platform can be an ideal platform for supporting traditional EAI (Enterprise Application Integration) and B2B exchanges.

Computing System

Figure 2:
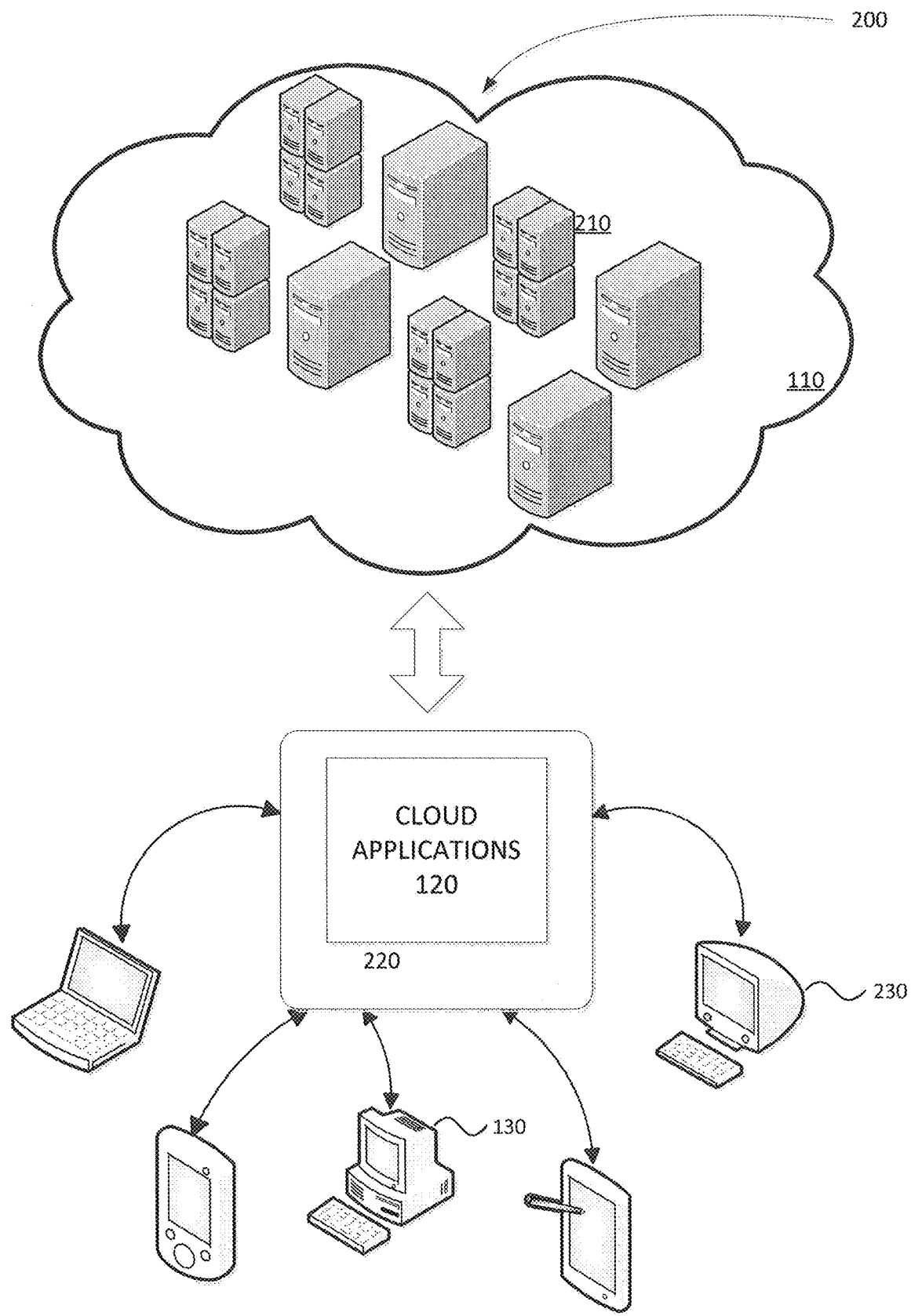
FIG. 2 illustrates an exemplary network diagram illustrating a computing system with cloud applications according to an aspect of the application.

FIG. 2 is a network diagram that illustrates an example computing system 200 in accordance with embodiments of the disclosure. The computing system 200 shown in FIG. 2 is merely illustrative and is not intended to suggest any limitation as to scope or functionality. Embodiments of the disclosure are operable with numerous other configurations. With reference to FIG. 2, the computing system 200 includes a cloud computing platform 210, cloud applications 220, and client devices 230.

The cloud computing platform 210 may be configured to execute cloud applications 220 requested by the client devices 230. The cloud computing platform 210 may be configured to maintain the structured storage subsystem. The structured storage subsystem may store the cloud applications 220 and messages exchanged between the devices that are part of the cloud computing platform 210. The devices may include, for example, processors, storage disks, and network switches. The devices may store and execute the software that provides cloud applications 220. The cloud computing platform 210 may connect to the client devices 230 via a communications network, such as a wireless network, local area network, wired network, or the Internet.

The cloud applications 220 may be provided to the client devices 230. The software executed on the cloud computing platform 210 may implement the cloud applications 220. The cloud applications 120 may include editing applications, network management applications, finance applications, or any application requested or developed by the client devices 230.

The client devices 230 may be utilized by a user to interact with cloud applications provided by the cloud computing platform 210. Alternatively, there may be automated on-prem, in-cloud, or off-cloud systems and services that communicate with one another. The client devices 230, in some embodiments, registers with the cloud computing platform 210 to access the cloud applications 220. Any client with an account from the cloud computing platform 210 may access the cloud applications and other resources provided in the cloud computing platform 210. The client devices 230 include, without limitation, personal digital assistants, smart phones, laptops, personal computers, gaming systems, set-top boxes, or any other suitable client computing device. The client devices 230 may include user and system information storage to store user and system information on the client devices 230. The user information may include search histories, cookies, and passwords. The system information may include internet protocol addresses, cached Web pages, and system utilization. The client devices 230 may communicate with the cloud computing platform 210 to receive application results.

Accordingly, the computing system 200 may be configured with a cloud computing platform that provides cloud applications to the client devices 230. The cloud applications remove the burden of updating and management of multiple local applications from the client devices 230.

In an embodiment, the cloud computing platform may provide scalable queues through its structured storage system. The structured storage system may include tables that store messages generated by the cloud application executed on the cloud computing platform. The messages may be stored in scalable queues that are built on tables within the structured storage system.

As one skilled in the art will appreciate, the cloud computing platform may include hardware, software, or a combination of hardware and software. The hardware includes processors and memories configured to execute instructions stored in the memories. In one embodiment, the memories include computer-readable media that store a computer-program product having computer-useable instructions for a computer-implemented method. Computer-readable media include both volatile and nonvolatile media, removable and non-removable media, and media readable by a database, a switch, and various other network devices. Network switches, routers, and related components are conventional in nature, as are means of communicating with the same. By way of example, and not limitation, computer-readable media comprise computer-storage media and communications media. Computer-storage media, or machine-readable media, include media implemented in any method or technology for storing information. Examples of stored information include computer-useable instructions, data structures, program modules, and other data representations. Computer-storage media include, but are not limited to, random access memory (RAM), read only memory (ROM), electrically erasable programmable read only memory (EEPROM), flash memory or other memory technology, compact-disc read only memory (CD-ROM), digital versatile discs (DVD), holographic media or other optical disc storage, magnetic cassettes, magnetic tape, magnetic disk storage, redundant arrays of inexpensive disks (RAID), and other magnetic storage devices. These memory technologies can store data momentarily, temporarily, or permanently. For purposes of this specification and the claims, the phrase "computer-readable storage medium" and variations thereof, does not include waves, signals, and/or other transitory and/or intangible communication media.

Operating Environment

Figure 3:
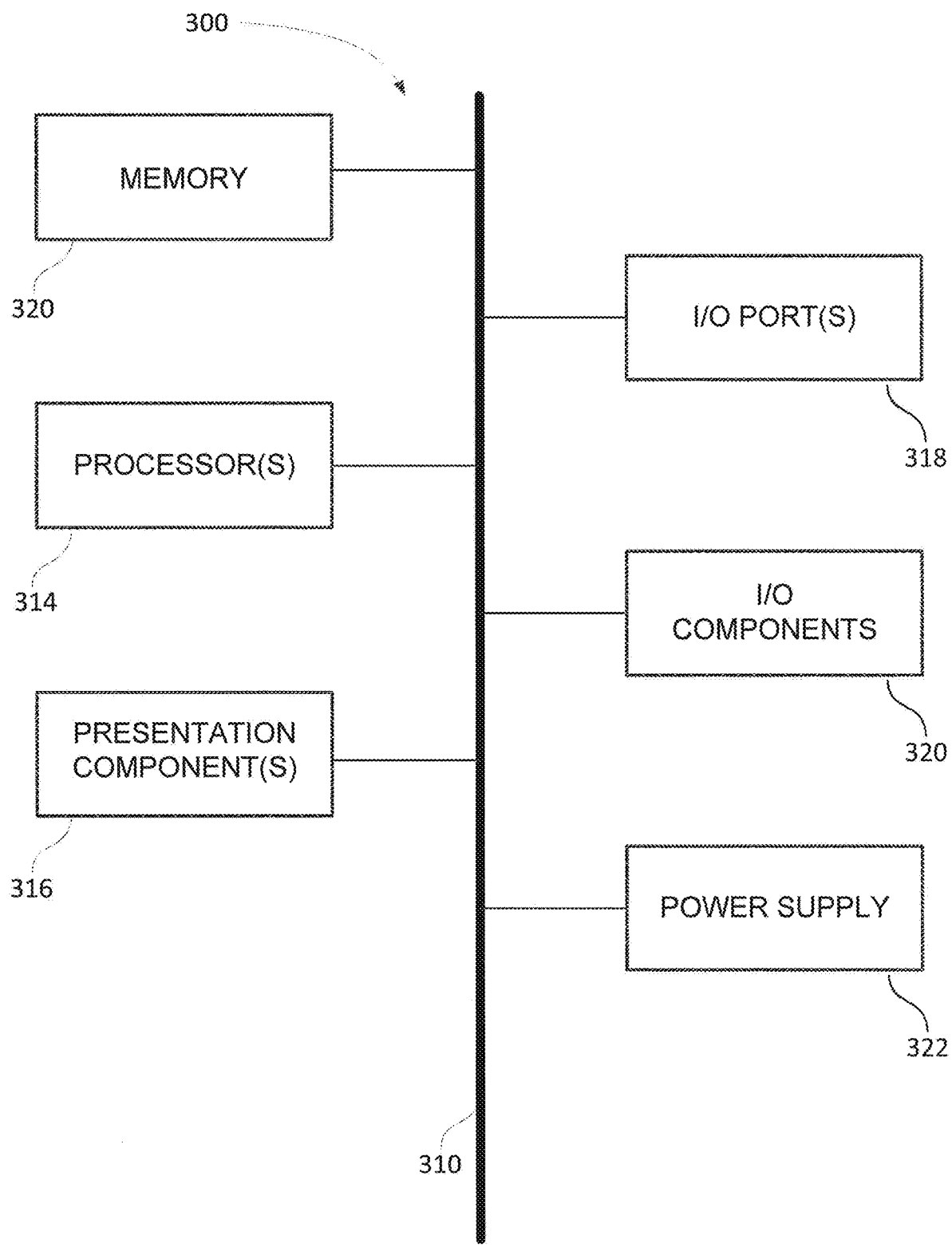
FIG. 3 illustrates an exemplary computing environment according to an aspect of the application.

The operating environment includes one or more computing devices 300 as illustrated in FIG. 3. Computing device 300 is but one example of a suitable computing environment and is not intended to suggest any limitation as to the scope of use or functionality of the disclosure. The application may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that performs particular tasks or implements particular abstract data types. The disclosure may be practiced in a variety of system configurations, including handheld devices, consumer electronics, general-purpose computers, specialty computing devices, etc. The disclosure may also be practiced in distributed computing environments where tasks are performed by remote-processing devices that are linked through a communications network.

With reference to FIG. 3, computing device 300 includes a bus 310 that directly or indirectly couples the following devices: memory 312, one or more processors 314, one or more presentation components 316, input/output (I/O) ports 318, input/output components 320, and an illustrative power supply 322. Bus 310 represents what may be one or more busses (such as an address bus, data bus, or combination thereof). Although the various blocks of FIG. 3 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 3 is merely illustrative of an example computing device that can be used in connection with one or more embodiments of the present disclosure. Distinction is not made between such categories as "workstation," "server," "laptop," "handheld device," etc., as all are contemplated within the scope of FIG. 3 and reference to "computing device."

Computing device 300 typically includes a variety of computer-readable media. Computer-readable media can be any available media that can be accessed by computing device 300 and includes both volatile and nonvolatile media, removable and non-removable media. By way of example, and not limitation, computer-readable media may comprise computer storage media and communication media. Computer storage media include volatile and nonvolatile, removable and non-removable media implemented in any method or technology for storage of information such as computer-readable instructions, data structures, program modules, or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium, which can be used to store the desired information and which can be accessed by computing device 300.

Memory 312 includes computer-storage media in the form of volatile and/or nonvolatile memory. The memory may be removable, non-removable, or a combination thereof. Exemplary hardware devices include solid-state memory, hard drives, optical-disk drives, etc. Computing device 300 includes one or more processors that read data from various entities such as memory 312 or I/O components 320. Presentation component(s) 316 present data indications to a user or other device. Exemplary presentation components include a display device, speaker, printing component, vibrating component, etc.

I/O ports 318 allow computing device 300 to be logically coupled to other devices including I/O components 320, some of which may be built in. Illustrative components include a microphone, joystick, game pad, satellite dish, scanner, printer, wireless device, etc.

Figure 4:
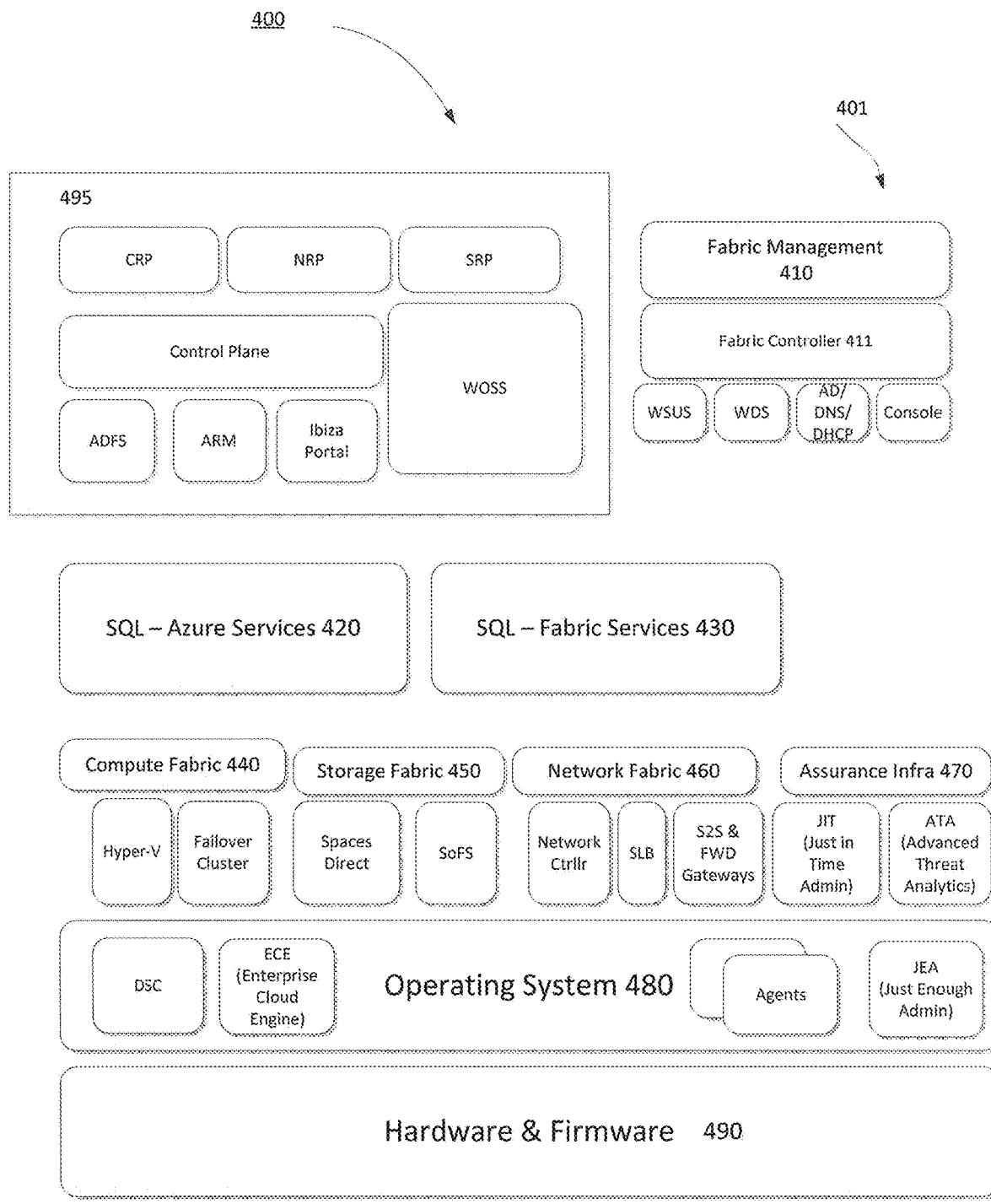
FIG. 4 illustrates an exemplary deployment layout in a data center according to another aspect of the application.

According to another aspect, a deployment layout 400 in a data center is illustrated in FIG. 4. The data center includes a plurality of nodes, e.g., physical machines, virtual machines and containers), network devices, serial devices, power devices, and other equipment that are operably interconnected and managed via the cloud computing fabric. The fabric provides underlying support for service applications that are distributed throughout the one or more data centers.

The deployment layout 400 includes but is not limited to fabric services 401 and Azure services 495. The fabric service 401 include a Fabric Management 410, SQL—Azure Services 420, SQL—Fabric Service 430, Compute Fabric 440, Storage Fabric 450, Network Fabric 460, Assurance Infra 470, an Operating System 480, and Hardware & Firmware 490. Each will be discussed in more detail below.

The Fabric Management 410 includes but is not limited to a Fabric Controller 411 responsible for various duties surrounding the monitoring, maintenance, and management of the health of computer resources, network gear, serial devices, and power units that support the underlying functionality of the fabric.

The SQL Azure services 420 may include data-storage capabilities as part of the Azure Services Platform. A SQL database may allow users to make relational queries against stored data which can either be structured or semi-structured, or even unstructured documents. The SQL database may include features such as querying data, search, data analysis and data synchronization.

Fabric services 430 may include a database for fabric services. For example, fabric services 430 may allow users to make relational queries against stored data that can either be structured or semi-structured, or even unstructured documents. In an embodiment, the database may be a SQL database that features querying data, search, data analysis, and data synchronization. The separation of the databases between the fabric services layer and the Azure services layer may allow for network isolation and different security access control levels.

The compute fabric 440 is the construction of interconnected nodes that look like a weave or fabric when viewed from a distance. The compute fabric 440 is a module that represents the aggregated compute resource pool of all the compute nodes in the fabric. The compute fabric 440 is typically supported by the underlying standalone hypervisors or clusters of the hypervisors. According to an embodiment, FIG. 4 illustrates a group of Microsoft's Hyper-V hosts and Hyper-V Failover Clusters. However, the same may be achieved using other hypervisor or clustering technologies.

The storage fabric 450 represents the aggregated storage resource pool of all the storage capacity in the fabric. It is typically supported by various software-defined storage technologies. According to an embodiment, FIG. 4. illustrates a storage fabric composed by Microsoft Storage Spaces Direct and Scale-Out File Server (SoFS) technologies. It is envisaged that the storage fabric may be achieved using various software-defined storage technologies known in the art.

The network fabric 460 represents the aggregated network resource pool of all the network capacity in the fabric. The network fabric 460 is typically supported by various software-defined networking technologies. In an embodiment, FIG. 4 shows a network fabric Microsoft Network Controller, Software-based Load Balancer (SLB), Site-to-Site (S2S) and Forwarding (FWD) Gateways. It is envisaged that the network fabric may be achieved using various software-defined networking technologies known in the art.

The assurance infrastructure 470 represents the set of software components that provide assurance services. In an embodiment as shown in FIG. 4, the set of assurance services includes but is not limited to Microsoft's Just-In-Time Administration (JIT), Just-Enough Administration (JEA) and Advanced Threat Analytics (ATA). These services allow the fabric administrators to control and fine-tune the access control levels inside of the fabric management services.

The operating system 480 is system software that manages computer hardware and software resources and provides common services for computer programs. The operating system is a component of the system software in a computer system. Examples of operating systems include but are not limited to Blackberry, BSD, iOS, Linus (Android, Chrome OS, Debian, Fedora, Gentoo, PCLinusOS, RHEL), OS X, QNX, Steam OS, Microsoft Windows, and zOS.

The hardware and firmware 490 represent the hardware layer that the cloud infrastructures run on.

The Azure services 495 include a compute resource provider (CRP) 495a, network resource provider (NRP) 495b, and a storage resource provider (SRP) 495c. The CRP 495a supports instances of virtual machines and optional availability sets. The NRP 495b supports required NICs, virtual machine IP addresses, and subnets within virtual networks and optional load balancers, load balancer IP addresses, and network security groups. The SRP 495c supports required storage accounts that store the virtual hard disks (VHDs) for virtual machines, including their operating system and additional data disks.

According to another aspect of the application, as shown for example in FIGS. 5A-I, a computer-implemented process is described for automatically detecting and updating an existing service or fabric in a cloud computing platform. According to the application, the existing services to be updated include but are not limited to iDns, Domain Controller/AD, ADFS, WOSS, Defender, Network Controller/Software Load Balancer, Gateway, WDS, WAP/WAS (portal), WSUS, CRP, NRP, and SRP.

According to an aspect of the application directed to the patching process, the fabric controller 411 described in FIG. 4 above may continuously monitor relevant updates for an existing service in an application stack, e.g., MAS (FIG. 5A). An update on a Library Share may generally be detected from an external source, such as for example, on a Microsoft Library Share. The fabric controller 411 may evaluate the differences between the image(s) and the updated image(s) (FIG. 5B). The Nano images refer to the existing image(s) for the service.

In one embodiment, instead of downloading the entire updated image for the service after the evaluating step, the fabric controller 411 may only download the differences between the Nano and updated images. The differences in images may be referred to as Diff images.

Next, the fabric controller 411 may merge the existing images with the Diff images residing on the Library Share resulting in the updated Nano (FIG. 5C). The fabric controller may build a new package for each software component using the build interface.

According to the build interface, the fabric controller can build the set of product images; build a system preparation image; customize a host image; and customize a guest image. In doing so, the downloaded updates for the particular service can be customized for the particular cloud computing platform.

After building the interface, the fabric controller may test the new product image offline. If successful, the fabric controller may copy the updated Nano virtual hard disk (vhd) package from the Library Share (offline) to a node as shown in FIG. 5E. According to an embodiment, the node may be running while copying of the updates takes place. FIG. 5D shows how the node appears just prior to adding the updated Nano to the node. The nodes in FIGS. 5D-I are described as physical machines with physical discs. However, it is envisaged to those skilled in the art that the nodes may be VMs or containers.

Accordingly, the physical disk shown in FIG. 5E includes both the Nano vhd (booted in) and the updated Nano vhd. The nodes in FIGS. 5D-I may also include an operating system described as either WinPE/Linux vhd in the upper level of the physical disk.

Next, as shown in FIG. 5F, the load associated with the updated Nano vhd is migrated to the physical disk residing in the physical machine. In practice, the live migration may be performed while the physical machine is running. At this stage, both the Nano vhd (booted in) and the updated Nano vhd packages may be present in the memory of the physical device on the physical machine. According to an embodiment, the merge may occur on some but not all of the nodes in the system.

Thereafter, the boot order of the node, e.g., physical machine, may be changed. The physical machine may be rebooted as illustrated in FIG. 5G whereby the updated Nano vhd package is booted in. This means the updated Nano vhd loads up instead of the old Nano vhd. However, the Nano vhd may remain in the memory until an instruction is received to remove it therefrom. In an embodiment, the boot order may be updated for some but not all of the nodes in the system.

In another embodiment, the node, e.g., physical machine, may be evacuated prior to the rebooting step. By so doing, the workload of the node may be transferred to another node in the cloud computing platform. The evacuated node may be rebooted, and then reassimilated into the cloud computing platform. The step of evacuating may include transferring services that are presently consuming resources such as for example, customer-owned applications and system-based applications, to another node on the cloud computing platform.

After the boot order is changed, a quick system reboot may be performed on the physical machine. The reboot may simultaneously occur on one or more physical machines in the system/platform. The reboot causes the updated Nano vhd to populate once the node is active. The node may then be put back in active service (accept load). The updated Nano vhd may then be configured in FIG. 5H to ensure it properly communicates with other hardware and software in the cloud computing platform.

After the node, e.g., physical machine, has been configured with the updated Nano vhd, the fabric controller may then validate the service. The validation generally takes place online.

During validation, the services are checked to ensure they operate properly. Moreover, the services continue to operate while being validated. If the validation is successful, the old Nano vhd may optionally be removed as shown in FIG. 5I. Alternatively, if the validation is unsuccessful, the platform can revert back to the configuration including the old Nano vhd. In order to revert back to the old Nano vhd, the fabric controller may edit the boot order designating the old Nano vhd. The updated Nano vhd that failed the validation step may then be removed.

In an embodiment, an exemplary flowchart of the steps is shown in FIG. 5J. For example, step 1 includes identifying an update for an existing cloud computing service operating on a cloud computing platform. Step 2 includes downloading the update for the existing service. Step 3 includes merging differences between the downloaded update and the existing service to create a new image. Step 4 includes testing the new image offline. Step 5 includes copying the new image to an online node in a data center. Step 6 includes validating the new image online.

According to another aspect of the application a networked system is described. The system may include architecture described above in regards to FIGS. 1-4. In particular, the system includes a node located in a data center. The node may be a virtual machine, physical machine or a container. In addition, the system may include plural nodes. The system may also include plural nodes located in plural data centers.

The system also includes a cloud computing platform operably coupled to the one or more nodes. The cloud computing platform includes a memory having instructions stored thereon for managing updates on the cloud computing platform. The platform also includes a controller, operably coupled to the memory, and configured to execute the instruction of downloading an update for an existing cloud computing service operating on the cloud computing platform. The platform also is configured to execute the instruction of merging differences between the downloaded update and the existing service to create a new image. The platform also in configured to test the new image offline. Further, the platform is configured to validate the new image online.

According to another embodiment, some original equipment manufacturers do not support firmware updating tools on a machine. In such instances, the following protocols are taken to enable operability as exemplarily illustrated in FIGS. 6A-E. The Linux or WinPE image will reside with the Nano image in the physical disk (FIG. 6A). A copy of the updated image is sent to the node as shown in FIG. 6B. Subsequently, a live migration of the load is performed as exemplarily shown in FIG. 6C. The firmware is then applied. The drivers are updated as illustrated in FIG. 6D. Finally, the boot order is changed resulting in the Nano image shown in FIG. 6E.

According to another aspect of the application, a cloud computing platform is described that automatically updates a service. The cloud computing platform may include one or more services operated by plural nodes. The plural nodes may be connected via a network. The plural nodes may be located across one or more data centers. The data centers may be public or private. The cloud computing platform may also include a controller that controls the overall state of the cloud computing platform.

The controller may detect and identify an update/image for a service running on one of the plural computing devices. The updates may be found on a Library Share. The controller may automatically download the update/image for the service. In one embodiment, the download may include only the differential 'diff' images. The controller may merge the diff images and the existing Nano images resulting in Updated Images.

The controller may then build a new package for the service with the Updated Images using the build interface. The build interface may allow the service to be customized for the particular cloud computing platform. In one embodiment, the new package for the service may be built and tested offline. The new package for the service may then distributed to a node operating on the cloud computing platform. In one embodiment, the new package may be distributed to plural nodes operating on the cloud computing platform. In yet another embodiment, the new package may be distributed to less than 99% of the nodes operating on the cloud computing platform. The node may include a physical machine, VM or a container.

Next, the controller may migrate a load for the new package onto the node. This may occur while the node is live, i.e., online and running. Similar to the distribution step, the controller may migrate the load onto plural nodes operating in the cloud computing platform. Moreover, the controller may migrate the load to less than 99% of the nodes operating in the cloud computing platform.

Upon completing the migration, a boot order on the node is updated. As a result, the updated Nano vhd appears after the node reboots. In one embodiment, the node may be evacuated prior to rebooting. The node may then be reassimilated to the network operating in the cloud computing platform.

In yet another aspect of the application, a computer-implemented process on a cloud computing platform is described. The process may include the step of identifying, via a controller, an update for an existing service. The process may also include the step of automatically downloading the update for the existing service. The update may include only the differential images with an existing image for the service. The process may also include the step of building a package for the updated service. This step may involve customizing the service for the particular cloud computing platform. The process may also include the step of copying the updated image onto the node. Next, the load for the updated image may be migrated, via the controller, to the node. The load may be migrated while the node is live. In one embodiment, the boot order is changed so that the updated service appears upon rebooting. In a further step, the updated service may be validated.

In an embodiment of this aspect, the original service may be removed after validation. In another embodiment, the boot order may be changed to operate the original service.

While certain example embodiments have been described, these embodiments have been presented by way of example only and are not intended to limit the scope of the described disclosure herein. Thus, nothing in the foregoing description is intended to imply that any particular feature, characteristic, step, module or block is necessary or indispensable. Indeed, the novel methods and systems described herein may be embodied in a variety of other forms. Furthermore, various omissions, substitutions and changes in the form of the methods and systems described herein may be made without departing from the spirit of the disclosure described herein.

What is claimed is:

1. A cloud computing platform comprising:
    a memory having instructions stored thereon for managing updates on the cloud computing platform, and
    a controller, operably coupled to the memory, and configured to execute the instructions of:
        identifying an update for an existing image of a cloud computing service operating on the cloud computing platform,
        testing a new image offline, the new image merging the existing image with differences between the existing image and an updated image associated with the update,
        transferring the tested new image to a storage device including the existing image booted on a node,
        migrating a load associated with the cloud computing service to the storage device,
        changing a boot order of the node to boot from the tested new image, rebooting the node using the tested new image,
configuring the node for communication with other hardware and software in the cloud computing platform, and
validating the tested new image online, including validating the configuration for communication with the other hardware and software in the cloud computing platform, and accepting the migrated load from the storage device.

2. The platform according to claim 1, wherein the controller is further configured to execute the instructions of transferring the tested new image to a plurality of nodes on the cloud computing platform.

3. The platform according to claim 2, wherein the controller is further configured to execute the instructions of migrating a load associated with the tested new image to the node and to the plurality of nodes on the cloud computing platform.

4. The platform according to claim 3, wherein the controller is further configured to execute the instructions of updating a boot order of the plurality of nodes.

5. The platform according to claim 4, wherein the controller is further configured to execute the instructions of rebooting the plurality of nodes to reflect the tested new image.

6. The platform according to claim 1, wherein the controller is further configured to execute the instructions of updating the boot order to revert back to the existing image if the validating is unsuccessful.

7. The platform according to claim 1, wherein the controller is further configured to execute the instructions of removing the existing image if the validating is successful.

8. The platform according to claim 1, wherein the cloud computing platform operates in a private cloud environment.

9. The platform according to claim 1, wherein the node is selected from a virtual machine, physical machine and container.

10. The platform according to claim 2, wherein the controller validates the plurality of nodes located in a plurality of data centers.

11. The platform according to claim 1, further comprising:
a compute fabric module, operably coupled to the controller and memory, adapted to generate data indicative of an aggregation of all compute nodes in the platform.

12. A computer-implemented method operating on a cloud computing platform comprising the steps of:
identifying, via a controller, an update for an existing image of a cloud computing service operating on the cloud computing platform;
testing, via the controller, a new image offline, the new image merging the existing image with differences between the existing image and an updated image associated with the update;
transferring, via the controller, the tested new image to a storage device including the existing image booted on an online node in a data center;
migrating a load associated with the cloud computing service to the storage device;
changing a boot order of the online node to boot from the tested new image;
rebooting the online node using the tested new image;
configuring the node for communication with other hardware and software in the cloud computing platform; and
validating, via the controller, the tested new image online, including validating the configuration for communication with the other hardware and software in the cloud computing platform, and accepting the migrated load from the storage device.

13. The method according to claim 12, further comprising:
transferring the tested new image to a plurality of nodes on the cloud computing platform; and
migrating a load associated with the tested new image to the online node and to the plurality of nodes.

14. The method according to claim 13, further comprising:
updating a boot order of the plurality of nodes.

15. The method according to claim 14, further comprising:
rebooting the plurality of nodes to reflect the tested new image.

16. The method according to claim 12, further comprising:
updating the boot order to revert back to the existing image if the validating is unsuccessful.

17. The method according to claim 12, wherein the cloud computing platform operates in a private cloud environment.

18. The method according to claim 12, wherein the online node is selected from a virtual machine, physical machine and container.

19. The method according to claim 13, wherein the controller validates the plurality of nodes located in a plurality of data centers.

20. A networked system comprising:
a node located in a remote data center; and
a cloud computing platform operably coupled to the node, the cloud computing platform including:
a memory having instructions stored thereon for managing updates on the cloud computing platform, and
a controller, operably coupled to the memory, and configured to execute the instructions of:
identifying an update for an existing image of a cloud computing service operating on the cloud computing platform;
testing a new image offline, the new image merging the existing image with differences between the existing image and an updated image associated with the update,
transferring the tested new image to a storage device including the existing image booted on a node;
migrating a load associated with the cloud computing service to the storage device;
changing a boot order of the node to boot from the tested new image;
rebooting the node using the tested new image;
configuring the node for communication with other hardware and software in the cloud computing platform; and
validating the tested new image online, including validating the configuration for communication with the other hardware and software in the cloud computing platform, and accepting the migrated load from the storage device.

* * * * *